Jan. 15, 1935.  C. H. SCHURR ET AL  1,988,424
MACHINE TOOL
Filed Dec. 15, 1932   2 Sheets-Sheet 1

INVENTORS
Charles H. Schurr and
Homer C. Warner
BY
Hawgood and Van Horn
ATTORNEYS Patented Jan. 15, 1935

1,988,424

UNITED STATES PATENT OFFICE 1,988,424

MACHINE TOOL

Charles H. Schurr and Homer C. Warner, Cleveland, Ohio, assignors to The Lees-Bradner Company, Cleveland, Ohio, a corporation of Ohio Application December 15, 1932, Serial No. 647,362

3 Claims. (Cl. 90—9)

This invention relates to machine tools, and more particularly to tools by which toothed or grooved objects such as gears, splined shafts, and the like may be produced.

An object of the invention is to provide an improved means for producing such articles which will be simple in construction and operation.

Another object of the invention is to provide an improved means for producing such articles which will be rapid in operation.

Another object is to provide an improved means which will accurately produce such articles.

Another object is to provide an improved means for producing such articles which will be compact.

Figure 1:
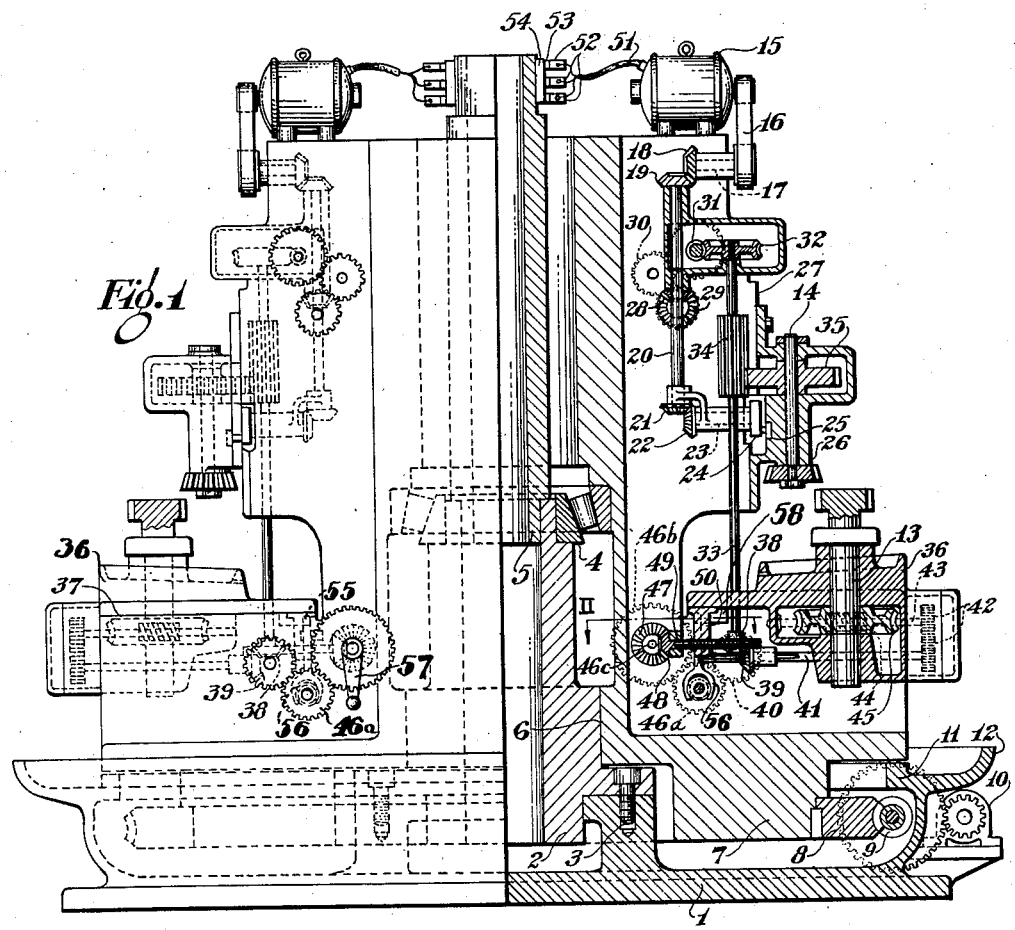
Figure 2:
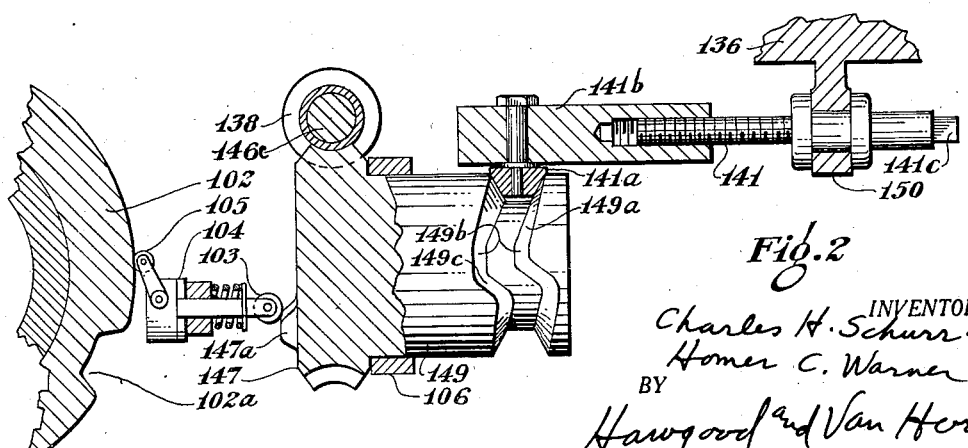
Figure 3:
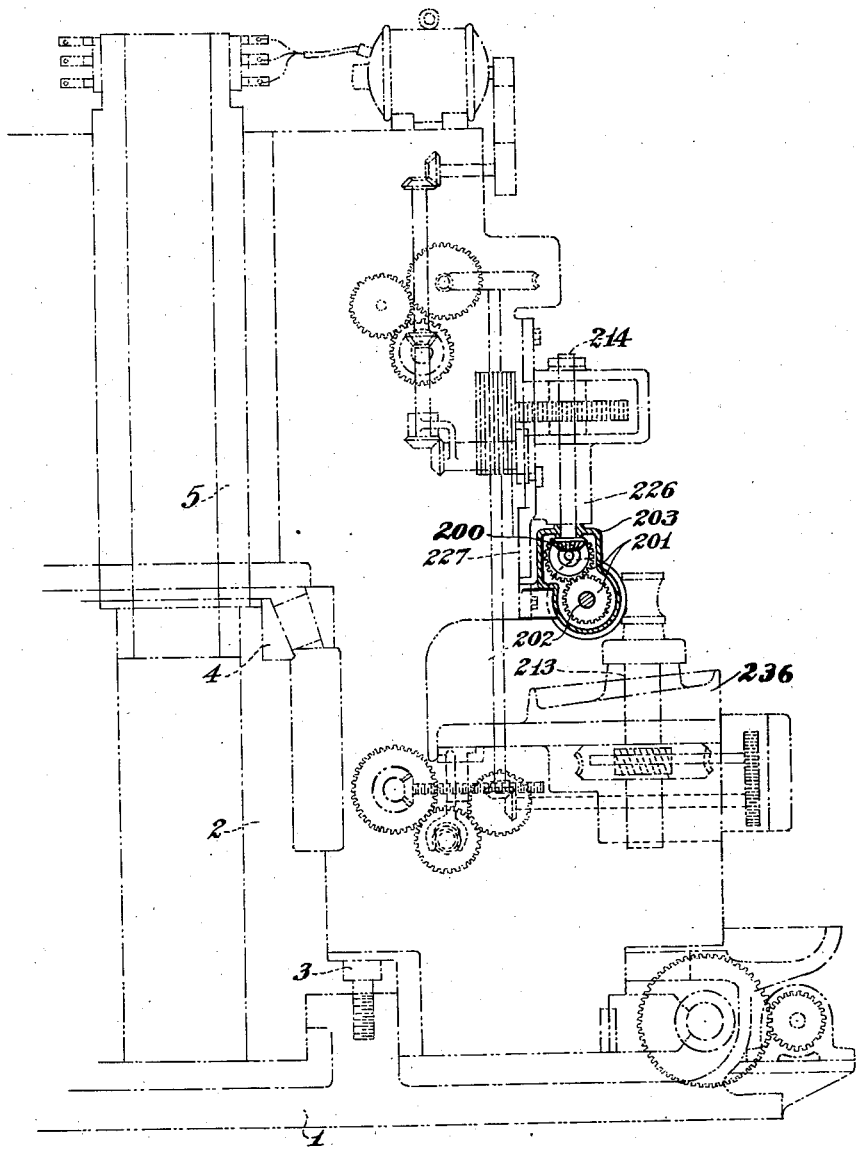

The invention will be better understood from the description of the practical embodiments thereof illustrated in the accompanying drawings, in which;

Figure 1 is a side elevational view, partly in section, of a machine arranged for producing articles by a shaping or splining operation;

Figure 2 is a fragmentary partially diagrammatic view corresponding to line II—II of Figure 1 and showing a modified form of feeding mechanism, a central supporting portion of the machine having been rotated for the purposes of this view through 90° about a horizontal line to facilitate showing of the cooperation of the various parts; and Figure 3 is a fragmentary view similar to Figure 1 showing the apparatus arranged to form the objects by a hobbing or milling operation.

In Figure 1 a machine is shown consisting of a base 1 carried by which is an upwardly extending central pedestal consisting of a lower support 2 secured to the base as by machine screws 3 and provided with a bearing 4 by which the operating mechanism is supported to rotate about a vertical axis passing through the center of the support and base. The upper portion of the pedestal 5 is secured to the support 2 and coaxial therewith.

Carried upon the bearing 4, and having other suitable bearings for maintaining it in proper alignment such as that indicated at 6, is a frame or turret 7 to the bottom of which is secured a worm wheel 8 driven by a worm 9 actuated by an electric motor 10 or other suitable driving means, the worm and worm wheel being conveniently positioned within the hollow of the base and in this space enclosed by a flange 11 extending beneath the lower outer margin of the frame. Another flange 12 extends outwardly and upwardly to form between the two flanges a circular trough for the reception of cooling fluid, chips and the like.

Arranged about the frame are a number of machine units each consisting of a work spindle 13 and a cutter spindle 14, together with mechanism for actuating the two. This mechanism is shown as driven by an electric motor 15 secured to the top of the frame, driving, by means of pulleys and a belt 16, a shaft 17 journalled in the frame and having on its inner end a bevelled gear 18 which meshes with a bevelled gear 19 secured to the upper end of a vertical shaft 20 also journalled in the frame.

The lower end of this vertical shaft is provided with a bevelled gear 21 meshing with another bevelled gear 22 secured to a horizontal shaft 23 journalled in the frame and provided at its outer end with a crank 24. This crank is connected to a block 25 reciprocable in a transverse slot in a slide or cutter head 26 arranged to be reciprocated along substantially vertical ways 27 formed upon the frame, and in this slide is journalled the tool spindle 14 previously mentioned.

The vertical shaft 20 is provided with another bevelled gear 28 meshing with a bevelled gear 29 which drives, through suitable change gears 30, a worm 31. This worm is in mesh with a worm wheel 32 at the upper end of a vertical shaft 33 which has at an intermediate point a wide pinion 34. Meshing with this pinion is a gear 35 secured to the tool spindle, the pinion and gear being so arranged that, during the operation of the machine, they remain in mesh, sliding upon one another as the slide is reciprocated by the crank.

Mounted upon the frame is a work head 36 supported on horizontal ways 37 so that it may be adjusted toward and from the axis of the tool spindle, and journalled in this head is the work spindle 13 above mentioned.

Upon the lower end of vertical shaft 33 is a bevelled gear 38 meshing with two other bevel gears 39 and 40, one of which 39 is splined to horizontal shaft 41 carried by the work head, this shaft driving, through suitable change gears 42, a second horizontal shaft 43 journalled in the work head, which in turn is provided with a worm 44 meshing with a worm wheel 45 secured to the work spindle. The bevelled gear 40 drives, through suitable change gears 46a and 46b, shaft 46c to which is attached bevelled gear 47 meshing with a bevelled gear 48 secured to a threaded shaft 49 journalled in the frame and threaded through a depending boss 50 on the work head, and by it this work head may be fed toward and from the tool spindle.

The motor is shown provided with conductors 51 terminating in brushes 52 which slide upon collector rings 53 carried by an insulating support 54 upon the upper end of the central pedestal, and obviously this current can be controlled by any suitable arrangement of switches, so that the motor may be stopped when the unit reaches a predetermined point, such as the position where the operator unloads and loads the machine.

The frame may be rotated continuously or it likewise may be stopped when a unit reaches the operator station.

A lever 55 is pivoted to the frame and provided with a lower bifurcated end 56 by which it may throw gear 46a out of mesh with the rest of the gear train operating the feed screw or shaft 49, so that the work head may be returned to its initial position manually by the operator by means of the crank handle 57. The upper end of the lever is moved by a tapered block 58 secured to the workhead 36 to disengage the gears.

The operation of the apparatus above described is very simple. The operator secures a blank to the work spindle in a position in which it may be engaged by the cutter upon the tool spindle. The motor is started, either manually or automatically, driving through shafts 17, 20, 23, 33, 41, and 49 and the gearing above described. The work and cutter rotate slowly while the cutter is reciprocated much more rapidly, and at the same time the axis of the work is brought very gradually toward that of the cutter. If the teeth of the cutter correspond to those of a gear of the involute system, they will generate involute teeth in the work.

If the pinion 34 has teeth parallel its axis, the apparatus will produce articles having teeth parallel their axes, but if it is desired to produce oblique teeth, such as those of helical gears, it is only necessary to provide a pinion 34 and gear 35 having helical teeth of the proper lead.

When the cutter has been fed in to the required depth lever 55 is actuated to disconnect the gearing, the cutting operation proceeds until all of the teeth have been cut to a uniform depth and surface before the motor is stopped. When the unit reaches the operator's station, he can return the work head by rotating the crank to its starting position and then re-engage the change gears 46a and 46b, when the apparatus will be ready to start upon another cutting cycle.

In the embodiment illustrated in Figure 2, the means for reciprocating the work head is shown as including a cam 149 which has attached to it a worm wheel 147 driven by a worm 138 mounted upon shaft 146c (which corresponds to shaft 46c of Figure 1). This cam has a generally helical groove 149a provided with a non-helical portion 149b and a steeper helical portion 149c, and in this groove is a roller 141a carried by a reciprocable bar 141b into which is threaded a rod 141 journalled in the depending boss 150 of the work head or slide 136, (which corresponds to 36 in Figure 1). The bar is shown as having a squared head 141c by which it may be rotated to adjust the position of the slide.

Secured to the cam is a projecting boss 147a adapted to contact a roller 103 carried by a limit switch 104, this limit switch having another roller 105 arranged to rotate upon a ring formed on the column 102, (corresponding to 2 of Figure 1). This ring has a notch 102a into which the last mentioned roller may drop when the unit reaches the operator's station.

The operation of this apparatus is the same as that above described, excepting, of course, that the feed of the work toward the cutter is accomplished by the cam. When the cutter has been fed to its desired depth, the roller 141a travels along the flat portion 149b of the cam, providing a dwell for a finishing cut, and immediately before reaching the operator's station the steep portion of the cam 149c quickly retracts the work slide from the cutter. When the lug 147a engages the roller 103 and switch 104 is actuated to stop the motor, which remains stopped until the unit reaches and passes the operator's station, at which time the roller 105 drops into the notch 102a in the ring, permitting the motor to start, and by the time this roller reaches the end of the notch, the lug has passed beyond the first mentioned roller.

In Figure 3, the mechanism has been arranged for turning or milling of worms and the like employing a cutter similar to that shown in Fig. 1, by the provision of a bevelled gear 200 upon shaft 214, which drives through suitable change gears 201, a cutter spindle 202 having a substantially horizontal axis, the cutter spindle being carried by an adjustable support 203 secured to the tool slide 226 or its ways 227. The tool slide 226 is locked against movement and the work head 236 is fed toward the cutter spindle 214 in the same manner as above described.

While we have described several illustrated embodiments of our invention in some particularity, obviously many others will readily occur to those skilled in this art, and we do not, therefore, limit ourselves to the precise details shown and described but claim as our invention all embodiments, variations and modifications thereof coming within the scope of the appended claims.

We claim:

1. A machine tool comprising a base, a frame rotatable thereon, a plurality of machine units carried by said frame, each comprising a work spindle, tool spindle, and an electric motor for driving said spindles, means for rotating the frame upon the base, switch means controlling said motor, means driven by said motor controlling said switch means, and means operated by the motion of the frame upon the base controlling said switch means.

2. A machine tool comprising a base, a frame rotatable thereon, a plurality of machine units carried by said frame each provided with an electric motor, means for rotating the frame upon the base, means supplying electricity to each motor, a switch controlling the motor, a movable element associated with said switch and operated by the machine unit, and a second movable element associated with said switch and operated by the motion of the frame upon the base.

3. A machine tool comprising a base, a frame rotatable thereon, a plurality of machine units carried by said frame each provided with an electric motor, means for rotating the frame upon the base, means supplying electricity to each motor, a switch controlling the motor, cam means operated by the relative movement of the frame upon the base and arranged to actuate said switch, and cam means operated by said unit and arranged to actuate said switch.

CHARLES H. SCHURR.
HOMER C. WARNER.